United States Patent [11] 3,593,194

[72] Inventors T. O. Paine
Administrator of the National Aeronautics and Space Administration with respect to an invention of;
John R. Rasquin, Melborne, Fla.; Fred R. McDevitt, Melborne, Fla.
[21] Appl. No. 863,276
[22] Filed Oct. 2, 1969
[45] Patented July 13, 1971

[54] LASER COOLANT AND ULTRAVIOLET FILTER
5 Claims, 1 Drawing Fig.
[52] U.S. Cl. .................................................. 331/94.5, 350/1, 350/312
[51] Int. Cl. .................................................. H01s 3/04, H01s 3/09, G021 5/24
[50] Field of Search ...................................... 331/94.5; 350/1—3, 312

[56] References Cited
UNITED STATES PATENTS
3,454,900  7/1969  Clay et al. ..................... 331/94.5
OTHER REFERENCES
CHEMICAL ABSTRACTS #2821 e Vol. 45, 1951 "Behavior of Inorganic Salts in Methonal"

Pellicori, " Transmittance of Some Optical Materials...." APPLIED OPTICS 3, (3) pp. 361 — 6, March 1964
Greene et al., " Effect of UV Pumping on Ruby Laser Output," APPLIED OPTICS 5 (2) Feb. 1966 pp. 350— 1
" Physical Constants of Inorganic Compounds (cont' d)" HANDBOOK OF CHEM. PHYS. 47th ed., pub by CRC, 1967 pp. 175
Hockh's CHEMICAL DICTIONARY, 4th ed., 1969, p. 23

Primary Examiner—Ronald L. Wibert
Assistant Examiner—Robert J. Webster
Attorneys—L. D. Wofford, Jr., Joseph H. Beumer and G. T. McCoy ABSTRACT: Ruby lasers are cooled and protected from detrimental ultraviolet radiation by means of a solution of copper sulfate in an alcohol solvent. The coolant-filter solution is disposed between the ruby crystal and the laser-actuating light source so as to absorb short-wavelength ultraviolet radiation, while allowing energy in the ruby pumping bands to pass through. Circulation of the solution removes heat from the laser crystal and improves its operation.

PATENTED JUL 13 1971 3,593,194
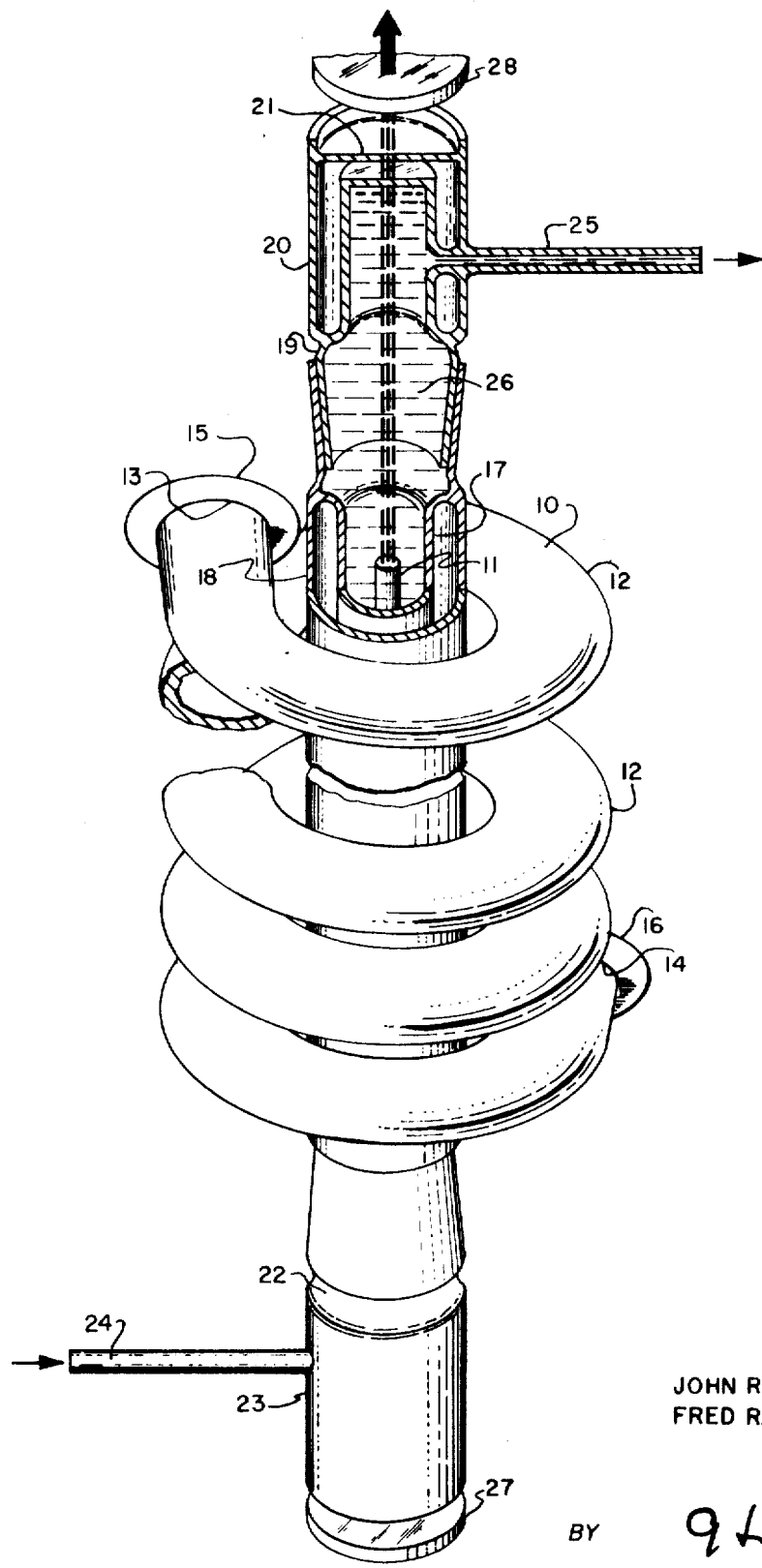
JOHN R. RASQUIN
FRED R. McDEVITT
INVENTORS
BY
ATTORNEYS

LASER COOLANT AND ULTRAVIOLET FILTER

ORIGIN OF THE INVENTION

The invention described herein was made in the performance of work under a NASA contract and is subject to the provisions of Section 305 of the National Aeronautics and Space Act of 1958, Public Law 85—568(72 Stat 435; 42 U.S.C. 2457).

BACKGROUND OF THE INVENTION

This invention relates to solid-state lasers and more particularly to an improvement in ruby laser systems.

Pulsed solid-state lasers are useful for applications involving a high-energy coherent light output, for example for manufacturing operations such as metal cutting and hole punching. The most common used pulsed laser employs a ruby crystal in which lasing action is produced by energy level transitions of chromium atoms in the ruby crystal structure. Ruby lasers include an elongated ruby crystal with reflective surfaces placed at each end and means such as a xenon flashlamp for directing radiant pumping energy to the crystal.

Significant problems have been encountered in increasing the pulsed energy output of ruby lasers to the levels desired for manufacturing operations. As would be expected, the energy output of ruby lasers can be increased by increasing the amount of pumping radiation incident on the crystal. This can be accomplished by increasing the current density of the pumping light source or by speeding up the interval between flashes. However, both of these measures result in large increases in the amount of radiated energy in ultraviolet portions of the spectrum, and the absorption of ultraviolet energy of certain wavelengths is detrimental to laser operation. The two pumping bands for chromium ions in ruby crystals are centered at wavelengths around 5500 angstroms and 4000 angstroms, the latter band extending slightly into the near ultraviolet region to about 3500 angstroms. Chromium ions also show a strong absorption at about 2000 angstroms, which absorption detracts from the energy output of the crystal with continued use. Since the available light sources for producing the pumping radiation, and in particular the most widely used xenon-filled flash tubes, are characterized by a high output of ultraviolet radiation at around 2000 angstroms in addition to the desired longer-wavelength pumping radiation, a selective filter or absorbent is needed to minimize the amount of shorter wavelength ultraviolet radiation reaching the crystal. Ultraviolet radiation is absorbed by some types of glass such as Pyrex, but at high intensities such absorption results in "-solarizing" the glass so that light transmission is decreased. Quartz or other material transparent and stable to ultraviolet radiation is accordingly needed to provide longer-life glassware in high-intensity laser flashlamps.

Another problem presented in the operation of crystal lasers at high energy levels is the provision of a suitable coolant. Incident pumping radiation generates a substantial amount of thermal energy in the crystal and the crystal temperature is increased with increasing power levels. The threshold energy level for lasing action is in turn increased with increasing temperatures so that some means of cooling the crystal is required to keep the threshold at a practical value. In addition, operating efficiency of ruby laser systems increases with decreasing temperatures; consequently, maximum efficiency would be obtained by maintaining the crystal at a constant minimum value.

Ruby laser crystals have been cooled previously by various techniques including the use of vapors from liquid air or liquid nitrogen or cold water. Such systems present disadvantages in that handling of cryogenic, normally gaseous liquids involves bulky hardware and safety hazards detrimental to some applications, and water freezes at 32° F. An improved liquid coolant is needed to meet the requirements imposed by high-energy ruby laser systems. In order to allow easy handling consistent with a minimum operating temperature, the coolant should be a liquid at ambient temperatures and should have an extremely low freezing point. A high specific heat is required for effective cooling, and the coolant should exhibit minimum absorption of light in the ruby crystal pumping bands in order to avoid a loss in efficiency.

SUMMARY OF THE INVENTION

In the present invention crystal lasers are cooled and the crystals therein are protected from shorter-wavelength ultraviolet radiation by means of a solution of copper ions in an alcohol solvent. The copper-containing coolant-filter solution is disposed in the space between the ruby crystal and the pumping light source and is circulated to remove heat from the crystal. Copper ions in the solution absorb ultraviolet radiation in the wavelength region shorter than 3000 angstroms, while allowing substantially all of the longer wavelength pumping energy to pass through. The alcohol solvent, and in particular the preferred 4:1 mixture of ethanol and methanol, has a very low freezing point and good heat transfer characteristics so that the laser crystal can be kept at a low temperature favorable to high operating efficiency.

It is therefore an object of this invention to provide a liquid coolant for crystal lasers.

Another object is to provide a liquid filter for selectively absorbing short wavelength ultraviolet radiation produced by xenon flash lamps.

Another object is to provide ruby laser systems capable of operating at high energy levels and fast repetition rates.

Other objects and advantages of the invention will be apparent from the following detailed description and the appended claims.

BRIEF DESCRIPTION OF THE DRAWING

In the drawing:

FIG. 1 is a perspective view, partly broken away, showing a ruby laser embodying the invention.

DESCRIPTION OF THE PREFERRED EMBODIMENT

Referring to the drawing, the ruby laser 10 includes an elongated ruby crystal 11 and a helical xenon-filled flashtube 12 surrounding and spaced apart from crystal 11. The ends 13 and 14 of flashtube 12 are connected to electrodes 15 and 16 of a power source (not shown) for supplying suitable electrical pulses. Ruby crystal 11 is mounted axially within a generally cylindrical quartz housing 17 disposed longitudinally within the flashtube 12. Housing 17 is surrounded by a quartz vacuum jacket 18 integral with housing 17 and forming an annular space extending longitudinally past the ends of crystal 11. The annular space is evacuated so as to prevent formation and deposition of frost on surfaces between crystal 11 and flashtube 12. The upper end of housing 17 is adapted to receive a hollow quartz stopper 19 having an integral vacuum jacket 20, the end portion of the vacuum jacket providing a frost-free window 21. A similar stopper 22 having vacuum jacket 23 and a frost-free end window (not shown) is fitted into the lower end of housing 17. Tubular inlet pipe 24 extends through vacuum jacket 23 into the interior of bottom stopper 22, and tubular outlet pipe 25 extends through vacuum jacket 20 into the interior of top stopper 19. A copper-alcohol liquid 26 which serves as coolant and ultraviolet filter is introduced into housing 17 through inlet 24 and is removed through outlet 25.

Mirrors 27 and 28 are disposed outside the lower and upper end windows, respectively, parallel to the ends of the ruby crystal and transverse to the path of light emanating from the crystal. Lower mirror 27 is fully reflective but upper mirror 28 is only partially reflective so as to allow the output coherent, amplified light beam to pass through.

In operation the flashtube 12 emits intense light in the pumping bands for ruby crystal 11 along with large amounts of ultraviolet radiation. The ultraviolet radiation below a wavelength of about 3000 angstroms is absorbed by the copper-containing liquid within housing 17, while the pumping energy is allowed to pass through and reach crystal 11. The incident pumping radiation produces lasing action in ruby crystal 11, and the resulting coherent light pulses emerge from mirror 28 after repeated reflection between mirrors 27 and 28. The copper-containing liquid coolant-absorber is circulated through housing 17 to remove heat generated in the crystal. The coolant after removal through outlet 25 is passed through a heat exchanger (not shown) and recycled through inlet 24. By this means the coolant is maintained at a predetermined low temperature down to about $-130°$ C. for the preferred ethanol-methanol coolant, and the crystal in contact therewith is maintained at an operating temperature only slightly higher.

The composition of the liquid coolant-ultraviolet filter of the present invention is based upon selective absorption of short wavelength ultraviolet radiation by the copper-containing solute and removal of heat by the alcohol solvent. Copper has uniquely useful absorption properties for the present application; it absorbs strongly at the region of intense and detrimental ultraviolet radiation produced by xenon flashtubes, that is, at around 3000 angstroms wavelength, and it is essentially transparent at the higher wavelength pumping bands. In addition, copper salts are soluble to the necessary extent in the preferred ethanol-methanol coolants. Other transition metals absorb strongly in the ultraviolet region, but only copper has been found to meet the other criteria of transparency in the pumping bands and solubility in alcohol. Copper is preferably employed in the form of copper sulfate, the sulfate radical being selected for its inertness to radiation in the visible and near-visible region along with its favorable solubility. Other soluble copper compounds can be used; however, the anion component should be inert and nonabsorbing inasmuch as prediction of stability would be difficult where both the metal and the radical are absorbing. In some cases the absorption band of copper ions can be shifted by selection of a particular radical other than sulfate, but copper sulfate is believed superior for most applications.

The alcohol solvent component of the coolant liquid can be any saturated primary alcohol or mixture of such alcohols, these alcohols being selected for their low freezing points, transparency and chemical stability under laser operating conditions. Since a minimum freezing point is desired, only the shorter-chain members (6 carbon atoms or less) of this group would be considered since the freezing point of alcohols is increased with chain length. Propanol has the lowest freezing point of these alcohols, but it is less satisfactory than ethanol or methanol as a solvent or component of a solvent mixture because of marginal solubility of copper sulfate and because of less favorable light transmission properties. The preferred solvent composition is a 4:1 volume mixture of ethanol and methanol, which mixture has a minimum freezing point, actually a viscous "glass" forming temperature, for the alcohols considered, that is, about $-130°$ C. Other ethanol-methanol mixtures, or the separate alcohols, can be used but at a sacrifice in minimum operating temperature. Another factor favoring the 4:1 ethanol-methanol mixture is that the light transmission properties of this mixture are better than for either methanol or ethanol alone.

The concentration of copper ions in the alcohol solvent is adjusted to obtain the desired extent of absorption, with the minimum effective concentration being preferred inasmuch as an excess concentration would decrease the transmission of pumping energy without providing any benefit. The required concentration depends on the amount of ultraviolet radiation emitted and the thickness of the coolant housing in the particular laser systems. For most large ruby lasers a coolant thickness of 50 to 100 millimeters between the flashtube and the crystal can be used, and under these conditions a copper sulfate concentration of about $10^{14}$ to $10^{12}$ molar provides effective absorption. The copper sulfate concentration should be increased with higher power levels and shorter coolant housing thicknesses.

Although the invention is illustrated above for a ruby laser having a helical flashtube encircling a ruby crystal, it is to be understood that the present improvement can be used for laser systems employing other geometrical arrangements and other types of laser crystals. For example, the pumping light source can be an elongated cylindrical flashtube placed parallel to and spaced apart from the crystal. The laser crystal can be made of any solid-state crystalline material which undergoes lasing action, in particular yttrium aluminum garnet or neodymium glass as well as ruby. All that is required for ultraviolet filtering in the present invention is placement of a transparent housing containing the coolant-filter liquid in the space between the laser crystal and light source. Effective cooling requires that the solution be in contact with the crystal and that it be circulated through the housing and passed through a heat exchanger.

It is to be understood that various other changes and modifications in the laser system described above may be employed without departing from the scope of the invention.

What we claim is:

1. A liquid coolant-ultraviolet filter for a crystal laser comprising a solution of copper sulfate in an alcohol solvent comprising a mixture of ethanol and methanol.

2. The invention as defined in claim 1 wherein said crystal laser is a ruby laser.

3. The invention as defined in claim 1 wherein said alcohol solvent is a 4:1 by volume mixture of ethanol and methanol.

4. The invention as defined in claim 3 wherein the concentration of copper sulfate is about $10^{14}$ to $10^{12}$ molar.

5. The method of maintaining a ruby laser crystal at a predetermined low operating temperature down to slightly above $-130°$ C. and shielding the same from ultraviolet radiation having a wavelength shorter than about 3000 angstroms in a ruby laser having an elongated ruby crystal and a laser-pumping light source disposed in spaced-apart relationship along the length of said crystal which comprises disposing a transparent, radiation stable housing defining a cavity between said crystal and said light source, circulating through said cavity a solution of copper sulfate in a 4:1 by volume mixture of ethanol and methanol in a manner such that a thickness of said solution sufficient to absorb substantially all of said ultraviolet radiation is interposed across the path of all incident radiation on said crystal and cooling said solution apart from said housing.